US010797389B2

(12) United States Patent
Bader et al.

(10) Patent No.: US 10,797,389 B2
(45) Date of Patent: Oct. 6, 2020

(54) NON-INVASIVE BEAM FORMING ADD-ON MODULE

(71) Applicant: KING ABDULLAH UNIVERSITY OF SCIENCE AND TECHNOLOGY, Thuwal (SA)

(72) Inventors: Ahmed Bader, Tla'a Al-Ali District (JO); Mohamed-Slim Alouini, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 312 days.

(21) Appl. No.: 15/738,261

(22) PCT Filed: Aug. 11, 2016

(86) PCT No.: PCT/IB2016/054849
§ 371 (c)(1),
(2) Date: Dec. 20, 2017

(87) PCT Pub. No.: WO2017/029590
PCT Pub. Date: Feb. 23, 2017

(65) Prior Publication Data
US 2018/0198203 A1 Jul. 12, 2018

Related U.S. Application Data

(60) Provisional application No. 62/205,911, filed on Aug. 17, 2015.

(51) Int. Cl.
*H01Q 3/28* (2006.01)
*H01Q 3/26* (2006.01)
(Continued)

(52) U.S. Cl.
CPC .......... *H01Q 3/28* (2013.01); *H01Q 3/26* (2013.01); *H04B 7/0617* (2013.01); *H04W 16/28* (2013.01); *H04W 84/18* (2013.01)

(58) Field of Classification Search
CPC combination set(s) only.
See application file for complete search history.

(56) References Cited

U.S. PATENT DOCUMENTS 6,272,336 B1 * 8/2001 Appel ............... H03G 3/3042
455/126
6,895,224 B1 * 5/2005 Munday ............ H03D 9/0633
455/3.02
(Continued)

FOREIGN PATENT DOCUMENTS

WO 2014072830 A2 5/2014
WO 2014076577 A2 5/2014

OTHER PUBLICATIONS

International Search Report in related International Application No. PCT/IB/2016/054849, filed dated Nov. 18, 2016.
(Continued)

*Primary Examiner* — Hassan A Phillips
*Assistant Examiner* — Gautam Sharma
(74) *Attorney, Agent, or Firm* — Patent Portfolio Builders PLLC

(57) ABSTRACT

An embodiment of a non-invasive beamforming add-on apparatus couples to an existing antenna port and rectifies the beam azimuth in the upstream and downstream directions. The apparatus comprises input circuitry that is configured to receive one or more signals from a neighboring node of the linear wireless sensor network; first amplifier circuitry configured to adjust an amplitude of a respective received signal in accordance with a weighting coefficient and invoke a desired phase to a carrier frequency of the received signal thereby forming a first amplified signal; and
(Continued)

second amplifier circuitry configured to adjust a gain of the first amplified signal towards upstream and downstream neighbors of the linear wireless sensor in the linear wireless sensor network.

20 Claims, 6 Drawing Sheets

(51) Int. Cl.
H04B 7/06 (2006.01)
H04W 16/28 (2009.01)
H04W 84/18 (2009.01)

(56) References Cited

U.S. PATENT DOCUMENTS

| | | | |
|---|---|---|---|
| 9,455,700 B1* | 9/2016 | Xiao | H04B 1/44 |
| 2005/0057421 A1 | 3/2005 | Mohamadi | |
| 2005/0165950 A1* | 7/2005 | Takagi | H04L 12/413 |
| | | | 709/236 |
| 2007/0092019 A1* | 4/2007 | Kotecha | H04B 7/0452 |
| | | | 375/267 |
| 2010/0007421 A1* | 1/2010 | Vice | H03H 11/245 |
| | | | 330/284 |
| 2010/0045372 A1* | 2/2010 | Ishizaki | H03F 1/22 |
| | | | 330/109 |
| 2010/0117903 A1* | 5/2010 | Zheng | H01Q 3/2605 |
| | | | 342/373 |
| 2012/0119568 A1* | 5/2012 | Orion | H04B 3/548 |
| | | | 307/3 |
| 2013/0244594 A1 | 9/2013 | Alrabadi et al. | |
| 2014/0312923 A1* | 10/2014 | Alley | G01R 19/0092 |
| | | | 324/713 |
| 2015/0261708 A1* | 9/2015 | Kehrer | G06F 13/4022 |
| | | | 710/110 |
| 2015/0343966 A1* | 12/2015 | Petrucci | H03M 9/00 |
| | | | 375/257 |
| 2016/0359459 A1* | 12/2016 | Zhu | H03F 1/223 |
| 2018/0219595 A1* | 8/2018 | Liu | H04B 7/04 |

OTHER PUBLICATIONS

Written Opinion of the International Searching Authority in related International Application No. PCT/IB/2016/054849, filed dated Nov. 18, 2016.

* cited by examiner

# NON-INVASIVE BEAM FORMING ADD-ON MODULE

CROSS-REFERENCE TO RELATED APPLICATION

This application is a continuation of International Application No. PCT/IB2016/054849, filed Aug. 11, 2016, which claims priority to U.S. provisional application entitled, "Non-Invasive Beamforming Add-On Module," having Ser. No. 62/205,911, filed Aug. 17, 2015, which are entirely incorporated herein by reference.

TECHNICAL FIELD

The present disclosure is generally related to antenna beamforming within a multihop network.

BACKGROUND

Mobile multihop networks have been considered lately as viable alternatives for the delivery and sharing of multimedia content between users.

SUMMARY

Embodiments of the present disclosure provide an apparatus and method for antenna beamforming within a linear wireless sensor network. One such apparatus, among others, comprises input circuitry of a linear wireless sensor network configured to receive one or more signals from a neighboring node of the linear wireless sensor network; first amplifier circuitry configured to adjust an amplitude of a respective received signal in accordance with a weighting coefficient and invoke a desired phase to a carrier frequency of the received signal thereby forming a first amplified signal; and second amplifier circuitry configured to adjust a gain of the first amplified signal towards upstream and downstream neighbors of the linear wireless sensor in the linear wireless sensor network.

In any one or more aspects, the input circuitry couples to one or more directional antennas. The second amplifier circuitry can comprise analog-to-digital circuitry configured to convert the first amplified signal to a digital signal and a mixer circuit element configured to adjust a frequency of the digital signal before passing the digital signal to a field-programmable gate array circuit element for adjusting the gain of the first amplified signal. In such an exemplary apparatus, the first amplifier circuitry and the analog-to-digital circuitry is configured to be disabled during a transmit state, in one embodiment.

In any one or more aspects, the one or more signals received by the input circuitry comprise a preamble of a data frame. The second amplifier circuitry can be configured to adjust the weighting coefficient of the first amplifier circuitry based on the adjusted gain. In such an exemplary embodiment, the second amplifier circuitry can be configured to perform a linearly constrained minimum variance (LCMV) process to adjust the weighting coefficient.

In any one or more aspects, the first amplifier circuitry can comprise a splitter circuit element configured to split the first amplified signal into a first split signal and a second split signal, wherein the first split signal is passed to the second amplifier circuitry and the second split signal is passed as an external output. In another embodiment, the first amplifier circuitry can be configured to be disabled during a transmit state.

One embodiment of a method, among others, includes receiving one or more signals from a neighboring node of a linear wireless sensor network; adjusting an amplitude of a respective received signal in accordance with a weighting coefficient and invoking a desired phase to a carrier frequency of the received signal thereby forming a first amplified signal; and adjusting a gain of the first amplified signal towards upstream and downstream neighbors of the linear wireless sensor in the linear wireless sensor network.

In one embodiment, such a method further comprises converting the first amplified signal to a digital signal; and adjusting a frequency of the digital signal before adjusting the gain of the first amplified signal. In any one or more aspects, the one or more signals can comprise a preamble of a data frame.

In one embodiment, such a method further comprises adjusting the weighting coefficient based on the adjusted gain. In an exemplary embodiment, the method further comprises performing a linearly constrained minimum variance (LCMV) process to adjust the weighting coefficient. In any one or more aspects, such a method further comprises splitting the first amplified signal into a first split signal and a second split signal, wherein the first split signal is passed to an amplifier circuitry block for adjusting the gain of the first amplified signal and the second split signal is passed as an external output.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

A multihop network, such as a wireless sensor network, includes a plurality of communication devices. An example is a wireless communication device. In a wireless sensor network, each of the communication devices is also a sensor. The communication device is referred to as a node.

Figure 1:
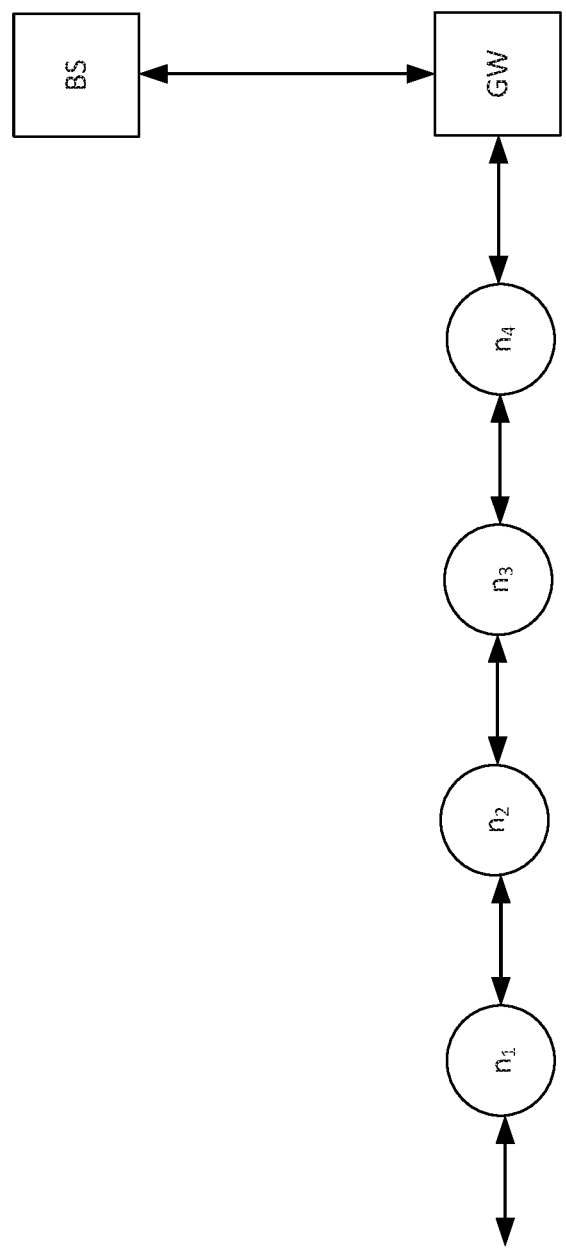
FIG. 1 is a block diagram of a linear wireless sensor network (LWSN) architecture in accordance with an embodiment of the present disclosure.

A linear wireless sensor network (LWSN) refers to the case in which sensors are deployed over a line such that data frames are forwarded in a linear fashion along the chain of sensors. Linear wireless sensor networks are seen in multiple industrial applications such as: wireless seismic surveys, pipeline monitoring systems, conveyor belts in process facilities; and aluminum smelters, among others. Unlike traditional wireless sensor network applications, real-time monitoring in these applications require linear placement of sensor nodes to detect and report an event of interest to a base station (BS) through gateways (GWs). FIG. 1 illustrates LWSN architecture in accordance with the present disclosure having a series of nodes ($n_i$) in linear placement with a gateway (GW) that is in communication with a base station (BS).

Since data frames are routed in a daisy chain fashion, it is quite beneficial if each sensor node can employ a directional antenna. The optimal antenna is one that maximizes gain along the line whether in the upstream or the downstream direction. In other words, it is an antenna whose radiation pattern has two main lobes that are aligned to the linear network topology.

A challenge with LWSNs is the fact that sensors are deployed manually in the field and thus the process is prone to misalignment. In other words, a sensor with a bi-directional antenna may be deployed with an azimuth offset from the network line. Many have proposed the replacement of single-element directional antennas with phased arrays of omni-directional antennas such that the antenna beam is steered towards the desired direction.

Indeed this is reasonable only when it does not entail major alteration or adjustment to the existing modem design. Otherwise, equipment manufacturers are refraining from utilizing such solutions due to the high cost associated with an adjusted ASIC (Application-Specific Integrated Circuit) design. Bearing that challenge in mind, embodiments of the present disclosure utilize a non-invasive beamforming add-on module or apparatus. The module couples to an existing antenna port and rectifies the beam azimuth in the upstream and downstream directions and does not entail any change to the existing modem ASIC or RF (Radio Frequency) circuitry. In addition, an exemplary embodiment of the beamforming add-on module maintains a small footprint and is energy-efficient.

Figure 2:
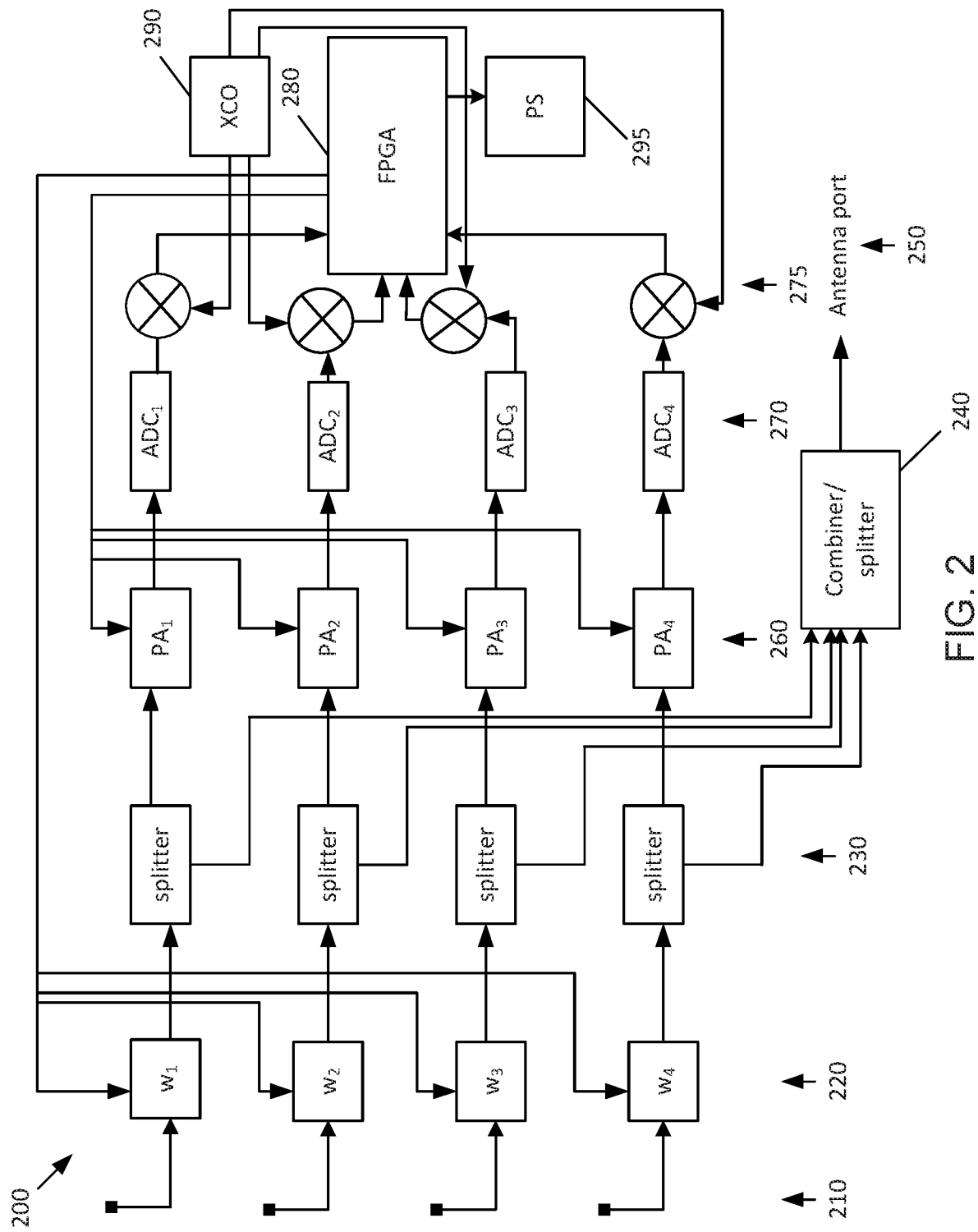
FIGS. 2-3 are block diagrams of an embodiment of a beamforming add-on module in accordance with an embodiment of the present disclosure.

FIG. 2 provides a block diagram of an embodiment of the beamforming add-on module 200 in a receive state. In the figure, four 2 dBi dipole antenna elements 210 are shown. In one embodiment, the maximum array gain in one direction is up to 8 dBi. The antenna elements 210 are arranged according to a uniform rectangular array (URA) geometry.

Each antenna element is followed by a weighting coefficient circuitry block 220. The weighting coefficient circuitry block 220 comprises a phased signal amplifier, i.e. amplifies/attenuates the signal received from the antenna array 210 in an input RF stage and invokes a desired phase to the carrier frequency. From the weighting coefficient circuitry block 220, the signal is split into two parts by a splitter circuitry block 230. One part of the signal propagates to the rest of the module blocks (beginning with an amplifier circuitry block 260) and the other part of the signal is received by a combiner/splitter circuit element 240. The combiner/splitter circuit element 240 combines the signals received from the respective splitter circuitry block elements and outputs a signal to the antenna port 250 on a sensor enclosure. This ensures that frame detection process by a receiving modem (on the existing enclosure) is uninterrupted.

The received signal from each antenna element $PA_i$ of the amplifier circuitry block 260 is amplified and passed through an $ADC_i$ element of an ADC (Analog-to-Digital Converter) circuitry block 270 and a mixer element of a mixer circuitry block 275 to a FPGA 280 (Field-Programmable Gate Array). The FPGA 280 executes an automatic gain control (AGC) process, as known to one of ordinary skill in the art, to optimize the gains of the amplifiers ($PA_i$). After adjusting the PA gains, the FPGA 280 receives a down-mixed signal ensemble from the mixer circuitry block 270. The FPGA 280 performs a beam scanning process on the received signal using a minimum variance distortionless response (MVDR) in order to estimate the angle of arrival of the incoming signal. Then it follows with a linearly constrained minimum variance (LCMV) process. Two objectives for the LCMV process are to maximize the gain towards the upstream and downstream neighbors and minimize the gain along the line perpendicular to the network line. A local oscillator (XCO) circuit element 290 is used with the mixer circuitry block 275 to input a signal at a desired frequency. A power supply (PS) 295 is provided (or made available) to provide a power source to the FPGA 280, in one embodiment.

Figure 3:
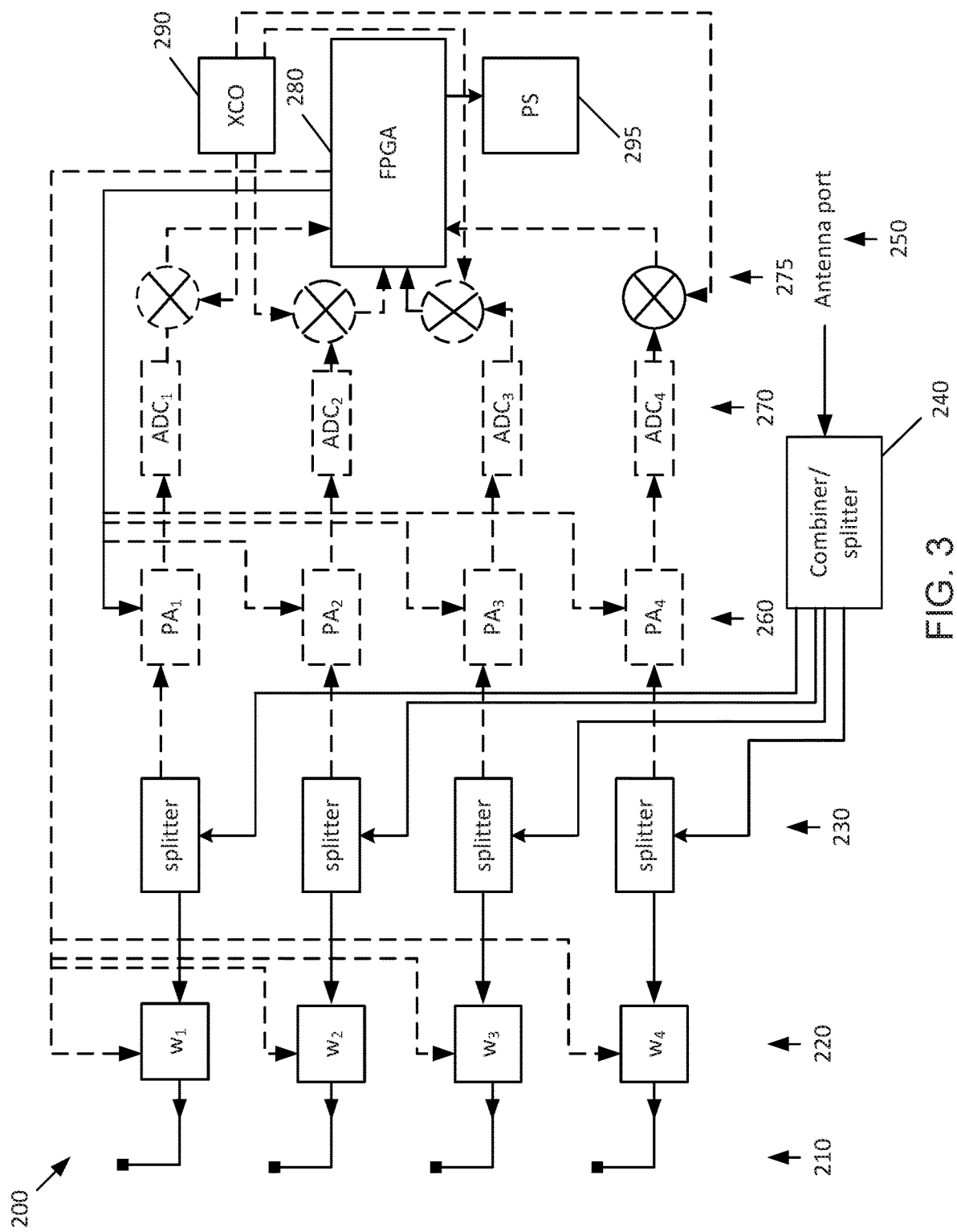

FIG. 3 illustrates the beamforming add-on module 200 while in a transmit state in one embodiment. It is noted that the power amplifiers 260 and analog-to-digital converters 270 are switched off to save energy (as represented by dashed lines in the figure). The FPGA 280 is only partially active. In fact, for an exemplary embodiment, the FPGA 280 disables all functions except for a clocked timer which will periodically wake up the system for recalibration of the antenna weight coefficients.

Figure 4:
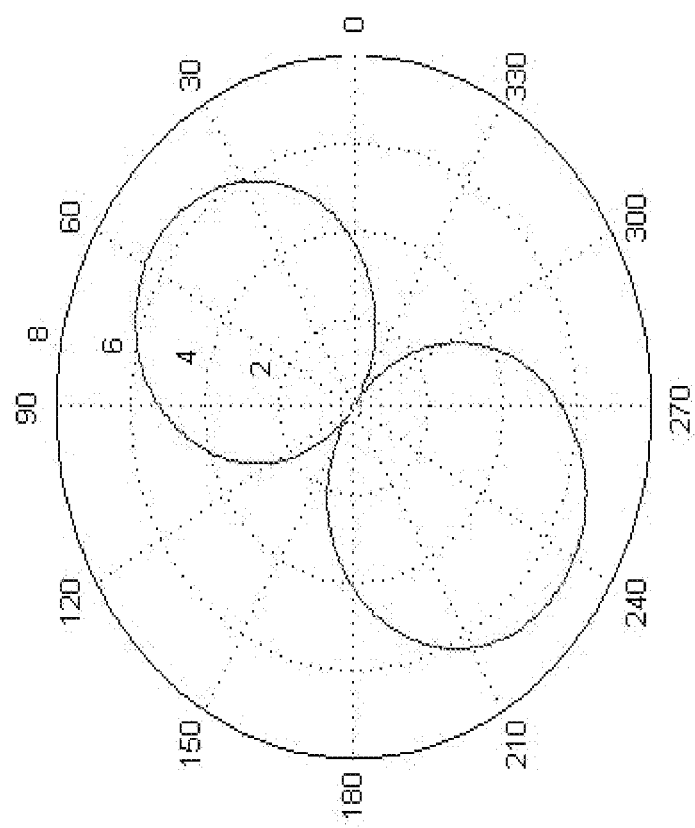
FIG. 4 is a diagram of a radiation pattern of antenna elements of FIG. 1 arranged in a uniform rectangular array (URA) geometry.

FIG. 4 depicts a typical radiation pattern of antenna elements 210 are arranged according to a uniform rectangular array (URA) geometry. In the figure, it can be noted that the offset of a respective node $n_i$ is 30 degrees from the upstream neighbor $n_{i-1}$ in the LWSN. It is further noted that at least four antenna elements are suited for efficient operation of the devised beamforming add-on module 200, in one embodiment. As shown by the radiation pattern, two elements will not be sufficient to distinguish 360 degrees. Three elements will cover the whole angular range but will not offer sufficient degrees of freedom to control the radiation pattern. Accordingly, four degrees of freedom (and thus four antenna elements) are suited in one embodiment: Two to maximize the gain along the network line and two to null the radiation pattern along the perpendicular line.

An exemplary beamforming add-on module 200 is configured in a way that makes it agnostic to the underling network communications protocol. The beamforming add-on module 200 is able to operate on any incoming signal without the need to decode it, in one embodiment. Therefore, an embodiment of beamforming add-on module 200 does not need to distinguish whether the incoming signal is upstream or downstream.

To further illustrate the operating feature described above, please refer to Table 1 and Table 2 below. In the example in Table 1, it is assumed that the LWSN undergoes a network initialization phase whereby a message is passed along the line from the access point or gateway GW in the downstream direction to all nodes $n_i$. After the network initiation phase is completed, normal data frame forwarding in the upstream direction starts. An example of the message flow through node n is given in Table 2.

In one embodiment, the beamforming add-on module 200 performs a mean least squares (MLS) operation to converge to an optimal vector of the weighting coefficients of the weighting coefficient circuitry block 220. The MLS operation is performed so as to generate two weighting vectors, one for the upstream direction and another for the downstream direction. To obtain that for the upstream direction, the MLS operation is performed on results attained from iterations 3 to 6. On the other hand, the downstream vector is attained by performing the MLS operations on iterations 1, 2, 7, and 8.

TABLE 1 network initiation phase

| Iteration at node n | Index | Message | Message Direction |
|---|---|---|---|
| 1 | $w^{(1)}$ | Request-to-send (RTS) message from neighbor n + 1 | Downstream |
| 2 | $w^{(2)}$ | Info/control message from neighbor n + 1 | Downstream |
| 3 | $w^{(3)}$ | clear-to-send (CTS) message from neighbor n − 1 | Upstream |
| 4 | $w^{(4)}$ | Acknowledgment (N/ACK) message from neighbor n − 1 | Upstream |

TABLE 2 upstream frame forwarding phase

| Iteration at node n | Index | Message | Message Direction |
|---|---|---|---|
| 5 | $w^{(5)}$ | Request-to-send (RTS) message from neighbor n − 1 | Upstream |
| 6 | $w^{(6)}$ | Data frame from neighbor n − 1 | Upstream |
| 7 | $w^{(7)}$ | clear-to-send (CTS) message from neighbor n + 1 | Downstream |
| 8 | $w^{(8)}$ | Acknowledgment (N/ACK) message from neighbor n + 1 | Downstream |

As previously mentioned, a challenge with LWSNs is the fact that sensors are deployed manually in the field and thus the process is prone to misalignment. In other words, a sensor with a bi-directional antenna may be deployed with an azimuth offset from the network line. Therefore, wireless sensors are typically equipped with omni-directional antennas although directional antennas are far more preferable. This is due to the fact that they can be exploited to offer better range, higher throughput, and better immunity to interference.

Specifically, immunity to interference stems from the fact that spectrum bandwidth available is always limited. Consequently, frequency resources are reused repeatedly in the network. Directional antennas, such as employed by embodiments of the present disclosure, indeed help confine the interference footprint of co-channel nodes and therefore results in reducing the overall level of interference. This in return can be used to increase the throughput attainable by each individual link and therefore increase the network capacity.

More concretely, an exemplary embodiment of the beamforming add-on module 200 can be used in LWSN in a wireless seismic application to introduce a 30% boost in a wireless seismic network capacity. This can be translated into a 30% higher data production capacity, 30% denser deployment of sensors, or a mixture of both. In other words, the beamforming add-on module 20 pushes the envelope of the seismic system to new boundaries. Further details and information on components of a wireless sensor network architecture in accordance with embodiments of the present disclosure are described in WO/2014/072830 publication, titled "An Improved Channel Assessment Scheme" and WO/2014/076577 publication, titled "An Improved Packet Structure," which are incorporated herein in their entireties.

Figure 5:
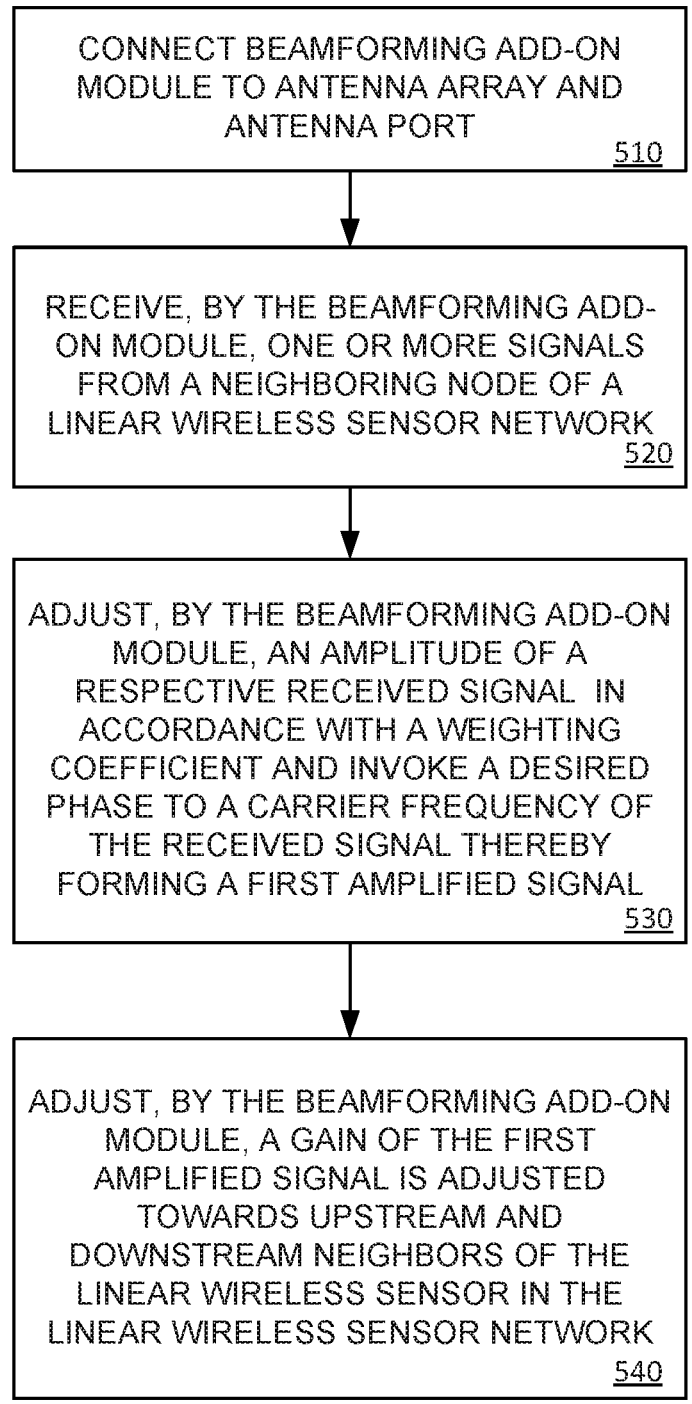
FIG. 5 is a flowchart diagram illustrating an exemplary non-invasive beamforming method in accordance with an embodiment of the present disclosure.

Referring now to FIG. 5, a flowchart is depicted illustrating an exemplary non-invasive beamforming method in accordance with an embodiment of the present disclosure. The exemplary method begins with connecting (510) a beamforming add-on module 200 to an antenna array 210 and an antenna port 250 of a node/sensor in a linear wireless sensor network. The method further includes receiving (520) one or more signals from a neighboring node of a linear wireless sensor network. Then, an amplitude of a respective received signal is adjusted (530) in accordance with a weighting coefficient and a desired phase is invoked to a carrier frequency of the received signal thereby forming a first amplified signal. Next, a gain of the first amplified signal is adjusted (540) towards upstream and downstream neighbors of the linear wireless sensor in the linear wireless sensor network. Additional actions may also be performed in further embodiments, such as performing a linearly constrained minimum variance (LCMV) process to adjust the weighting coefficient and splitting the first amplified signal into a first split signal and a second split signal, wherein the first split signal is passed to an amplifier circuitry block 260 for adjusting the gain of the first amplified signal and the second split signal is passed as an external output, among others.

In accordance with the present disclosure, an exemplary beam-forming add-on module or apparatus includes input circuitry of a linear wireless sensor ($n_i$) configured to receive one or more signals from a neighboring node ($n_{i-1}$, $n_{i+1}$) of the linear wireless sensor network; first amplifier circuitry 220 configured to adjust an amplitude of a respective received signal in accordance with a weighting coefficient and invoke a desired phase to a carrier frequency of the received signal thereby forming a first amplified signal; and second amplifier circuitry 260 configured to adjust a gain of the first amplified signal towards upstream and downstream neighbors of the linear wireless sensor in the linear wireless sensor network.

Figure 6:
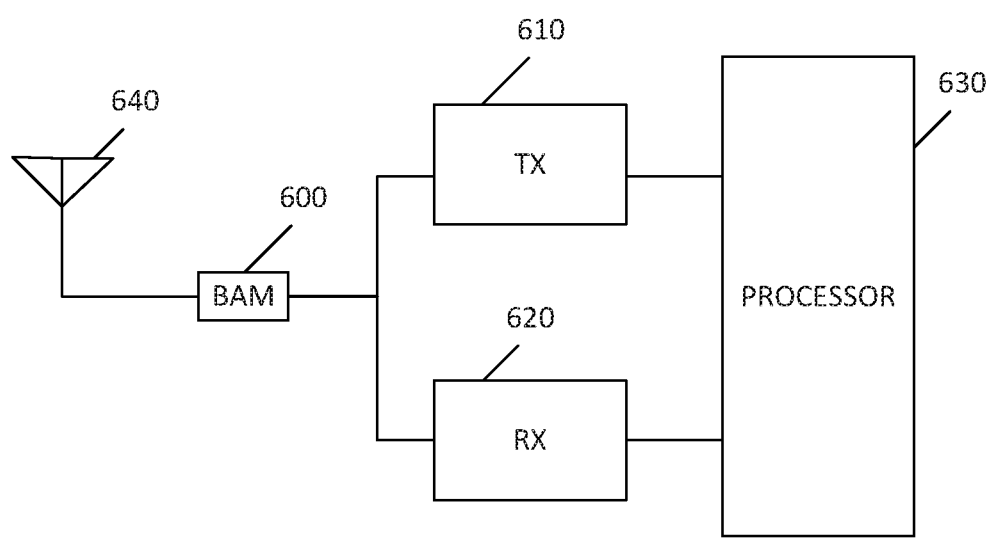
FIG. 6 is a block diagram of an exemplary embodiment of a node and beamforming add-on module of a LWSN in accordance with an embodiment of the present disclosure.

FIG. 6 illustrates an exemplary embodiment of a sensor node (e.g., $n_i$ in FIG. 1) and beamforming add-on module in a LWSN according to an embodiment of the present disclosure for implementing the method illustrated in FIG. 5. The sensor node includes a transmitter 610 and a receiver 620, both operably connected to digital data processing circuitry in the form of a programmable processor 630. The processor 630 controls and coordinates the operations of the transmitter 610 and the receiver 620. The transmitter 610 is adapted to transmit and the receiver is adapted to receive radio signals via an array of antenna elements 640. In accordance with the present disclosure, a beamforming add-on module 600 couples to both the antenna port of the sensor node and the antenna array 640 in order to improve upon reception of transmitted signals from neighboring nodes of the LWSN.

Certain embodiments of the present disclosure can be implemented in hardware, software, firmware, or a combination thereof. If implemented in hardware, embodiments can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It should be emphasized that the above-described embodiments of the present disclosure are merely possible examples of implementations, merely set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. An apparatus comprising:
a plurality of antennas configured to receive one or more signals from a neighboring node of a linear wireless sensor network;
a plurality of phased signal amplifiers, each coupled to a respective one of the plurality of antennas, wherein the plurality of phased signal amplifiers are configured to adjust an amplitude of a respective received signal in accordance with a weighting coefficient and adjust phase of a carrier frequency of the received signal to form a corresponding plurality of first amplified signals;
a plurality of splitters respectively coupled to the plurality of phased signal amplifiers, wherein each the plurality of splitters are configured to split a respective one of the corresponding plurality of first amplified signals into first and second split signals; and
a combiner circuit coupled to receive the second split signals from each of the plurality of splitters and configured to combine the second split signals from each of the plurality of splitters into a combined signal, wherein the apparatus is configured for coupling to a sensor antenna port and the combined signal is provided by the combiner circuit to the sensor antenna port.

2. The apparatus of claim 1, further comprising:
a plurality of power amplifiers coupled to a respective one of the plurality of splitters to receive the corresponding second split signals;
a plurality of analog-to-digital circuits coupled to a respective one of the plurality of amplifiers, wherein the plurality of analog-to-digital converters are circuitry configured to convert the first split signals into a corresponding plurality of digital signals; and
a plurality of mixer circuits coupled to a respective one of the plurality of analog-to-digital converters, wherein the plurality of mixer circuits are configured to adjust a frequency of the corresponding digital signal to form a corresponding plurality of frequency adjusted digital signals; and
coupled to the plurality of mixer circuits to receive the plurality of frequency adjusted digital signals and provide the plurality of phased signal amplifiers with the weighting coefficient.

3. The apparatus of claim 2, wherein the plurality of power amplifiers and the analog-to-digital circuitry are configured to be disabled during a transmit state.

4. The apparatus of claim 2, wherein the field programmable gate array is configured to perform a beam scanning process on the plurality of frequency adjusted signals using a minimum variance distortionless response (MVDR) to estimate an angle of arrival of the received signal and then perform a linearly constrained minimum variance (LCMV) process to adjust the weighting coefficient.

5. The apparatus of claim 4, wherein the LCMV process maximizes gain towards upstream and downstream neighbors and minimizes gain along a line perpendicular to a network line of a wireless sensor network comprising the upstream and downstream neighbors.

6. The apparatus of claim 2, wherein the plurality of power amplifiers are configured to be disabled during a transmit state.

7. The apparatus of claim 1, wherein the one or more signals received by the plurality of antennas comprise a preamble of a data frame.

8. The apparatus of claim 1, wherein the plurality of phased signal amplifiers are configured to adjust the amplitude of the respective received signal and adjust the phase of the carrier frequency of the received signal so that a first two of the plurality of antennas maximize gain along a network line of sensors of the linear wireless sensor network and a second two of the plurality of antennas null a radiation pattern along a line perpendicular to the network line of sensors.

9. A method comprising:
coupling a beamforming add-on module to a sensor antenna port, wherein the beamforming add-on module comprises a plurality of antennas coupled to a respective plurality of phased signal amplifiers, wherein the plurality of phased signal amplifiers are coupled to a respective plurality of splitters, and the plurality of splitters are coupled to a combiner circuit;
receiving, by the plurality of antennas, one or more signals from a neighboring node of a linear wireless sensor network;
adjusting, by the plurality of phased signal amplifiers, an amplitude of a respective received signal in accordance with a weighting coefficient and adjusting a phase of a carrier frequency of the received signal to form a corresponding plurality first amplified signals;
splitting, by the respective plurality of splitters, a respective one of the corresponding plurality of first amplified signals into first and second split signals;
combining, by the combiner circuit, the second split signals from each of the plurality of splitters into a combined signal; and
providing, by the combiner circuit, the combined signal to the sensor antenna port.

10. The method of claim 9, further comprising:
providing, by the plurality of splitters, the first split signal to a respective one of a plurality of power amplifiers;
amplifying, by the plurality of power amplifiers, the first split signal;
converting, by a plurality of analog-to-digital converters, the amplified first split signal to a digital signal; and
adjusting a frequency of the digital signal.

11. The method of claim 9, wherein the one or more signals comprise a preamble of a data frame.

12. The method of claim 9, further comprising:
estimating an angle of arrival of one of the received signals; and
adjusting the weighting coefficient based on the estimated angle of arrival.

13. The method of claim 12, further comprising:
performing a beam scanning process on the first split signals using minimum variance distortionless response (MVDR) to estimate the angle of arrival followed by a linearly constrained minimum variance (LCMV) process to determine the weighting coefficient.

14. The method of claim 13, wherein the LCMV process maximizes gain towards upstream and downstream neighbors and minimizes gain along a line perpendicular to a network line of the linear wireless sensor network comprising the upstream and downstream neighbors.

15. The method of claim 9, wherein the plurality of phased signal amplifiers are configured to adjust the amplitude of the respective received signal and adjust the phase of the carrier frequency of the received signal so that a first two of the plurality of antennas maximize gain along a network line of sensors of the linear wireless sensor network and a second two of the plurality of antennas null a radiation pattern along a line perpendicular to the network line of sensors.

16. A method, comprising:
receiving, from a neighboring node of a linear wireless sensor network, a plurality of signals from a corresponding plurality of antennas;
estimating an angle of arrival of each of the plurality of signals;
adjusting weighting coefficients of a phased signal amplifier based on the estimated angle of arrival;
receiving, from the neighboring node, another plurality of signals from the corresponding plurality of antennas, wherein the another plurality of signals are adjusted by the phased signal amplifier based on the weighting coefficients;
splitting the another plurality of signals into first and second split signals;
combining the second split signals; and
providing the combined second split signals to an antenna port of a sensor.

17. The method of claim 16, wherein the estimation of the angle of arrival of each of the plurality of signals comprises:
performing a beam scanning process on the first split signals using a minimum variance distortionless response (MVDR).

18. The method of claim 16, further comprising:
amplifying the first split signals;
converting the amplified first split signals from analog to digital; and
down-mixing the digital, amplified first split signals.

19. The method of claim 16, wherein the adjusted weighting coefficients maximize gain towards upstream and downstream neighboring nodes and minimizes gain along a line perpendicular to a line of the linear wireless sensor network.

20. The method of claim 16, wherein the plurality of phased signal amplifiers are configured to adjust the amplitude of the another plurality of received signals and adjust a phase of a carrier frequency of the another plurality of received signals so that a first two of the plurality of antennas maximize gain along a network line of sensors of the linear wireless sensor network and a second two of the plurality of antennas null a radiation pattern along a line perpendicular to the network line of sensors.

* * * * *